United States Patent [19]

Morimoto

[11] Patent Number: 4,819,513
[45] Date of Patent: Apr. 11, 1989

[54] TRANSMISSION RATIO CONTROL SYSTEM FOR A CONTINUOUSLY VARIABLE TRANSMISSION

[75] Inventor: Yoshihiko Morimoto, Mitaka, Japan

[73] Assignee: Fuji Jukogyo Kabushiki Kaisha, Tokyo, Japan

[21] Appl. No.: 31,947

[22] Filed: Mar. 27, 1987

[30] Foreign Application Priority Data

Mar. 31, 1986 [JP] Japan .................. 61-073689

[51] Int. Cl.$^4$ ............................................. B60K 41/18
[52] U.S. Cl. ........................... 74/866; 74/867; 364/424.1
[58] Field of Search ........... 74/866, 867, 868, 864, 74/865, 877; 474/11, 12, 18, 28; 364/424.1

[56] References Cited

U.S. PATENT DOCUMENTS

| | | | |
|---|---|---|---|
| 4,458,318 | 7/1984 | Smit et al. | 74/866 X |
| 4,466,521 | 8/1984 | Hattori et al. | 74/866 X |
| 4,515,040 | 5/1985 | Takeuchi et al. | 74/866 |
| 4,561,327 | 12/1985 | Niwa | 74/866 |
| 4,569,254 | 2/1986 | Itoh et al. | 74/866 |
| 4,593,582 | 6/1986 | Sawada et al. | 74/866 |
| 4,622,865 | 11/1986 | Itoh et al. | 74/866 |
| 4,637,279 | 1/1987 | Itoh et al. | 74/866 |
| 4,641,553 | 2/1987 | Kobayashi | 74/877 X |
| 4,649,488 | 3/1987 | Osanai et al. | 74/866 X |
| 4,665,773 | 5/1987 | Hiramatsu et al. | 74/866 |

FOREIGN PATENT DOCUMENTS 0205257 12/1986 European Pat. Off. .

Primary Examiner—Leslie A. Braun
Assistant Examiner—David Novais
Attorney, Agent, or Firm—Martin A. Farber

[57] ABSTRACT

A control system has a transmission ratio control valve having a spool for controlling oil supplied to a cylinder of a drive pulley to change the transmission ratio. The transmission ratio control valve has chambers at both ends of the spool. The amount of oil supplied to the chambers is controlled by a control signal which is determined by a desired transmission ratio and the actual transmission ratio, so that the transmission ratio is controlled.

13 Claims, 6 Drawing Sheets

TRANSMISSION RATIO CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling the transmission ratio.

A known control system for a continuously variable belt-drive transmission comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a hydraulic circuit including a pump for supplying oil to the servo devices, a line pressure control valve and a transmission control ratio control valve. Each valve comprises a spool to control the oil supplied to the servo devices.

The transmission ratio control valve operates to determine the transmission ratio in accordance with a control signal dependent on the opening degree of a throttle valve of an engine and the speed of the engine. The line pressure control valve is adapted to control the line pressure in accordance a control signal dependent on with the transmission ratio and the engine speed. The line pressure is controlled to prevent the belt from slipping on pulleys in order to transmit the output of the engine.

When starting the vehicle, the transmission ratio is set at a maximum value. When the vehicle speed and engine speed reach set values under a driving condition, the transmission ratio starts to change (to upshift). The transmission rato is automatically and continuously reduced at a rate which is determined by line pressure, the pressure of oil supplied to the servo device of the drive pulley, and the actual transmission ratio. In such a system, the rate of changing of transmission ratio up to a desired transmission ratio can not be controlled in accordance with driving conditions. Accordingly, hunting or overshooting of the transmission ratio occurs, which decreases the driveability of the vehicle.

European patent application No. 205257 discloses a transmission ratio control system in which a transmission ratio changing rate is di/dt is obtained by making calculation K(id−i), where id is desired transmission ratio and i is actual transmission ratio. In order to make the calculation, memories and calculator sections are provided. Accordingly, the system and program become complicated.

SUMMARY OF THE INVENTION

The object of the present invention is to provide a system for continuously variable transmission, which is simple in construction and program.

The other objects and features of this invention will become understood from the following description with reference to the accompanying drawings.

DETAILED DESCRIPTION OF THE PREFERRED EMBODIMENT

Figure 1:
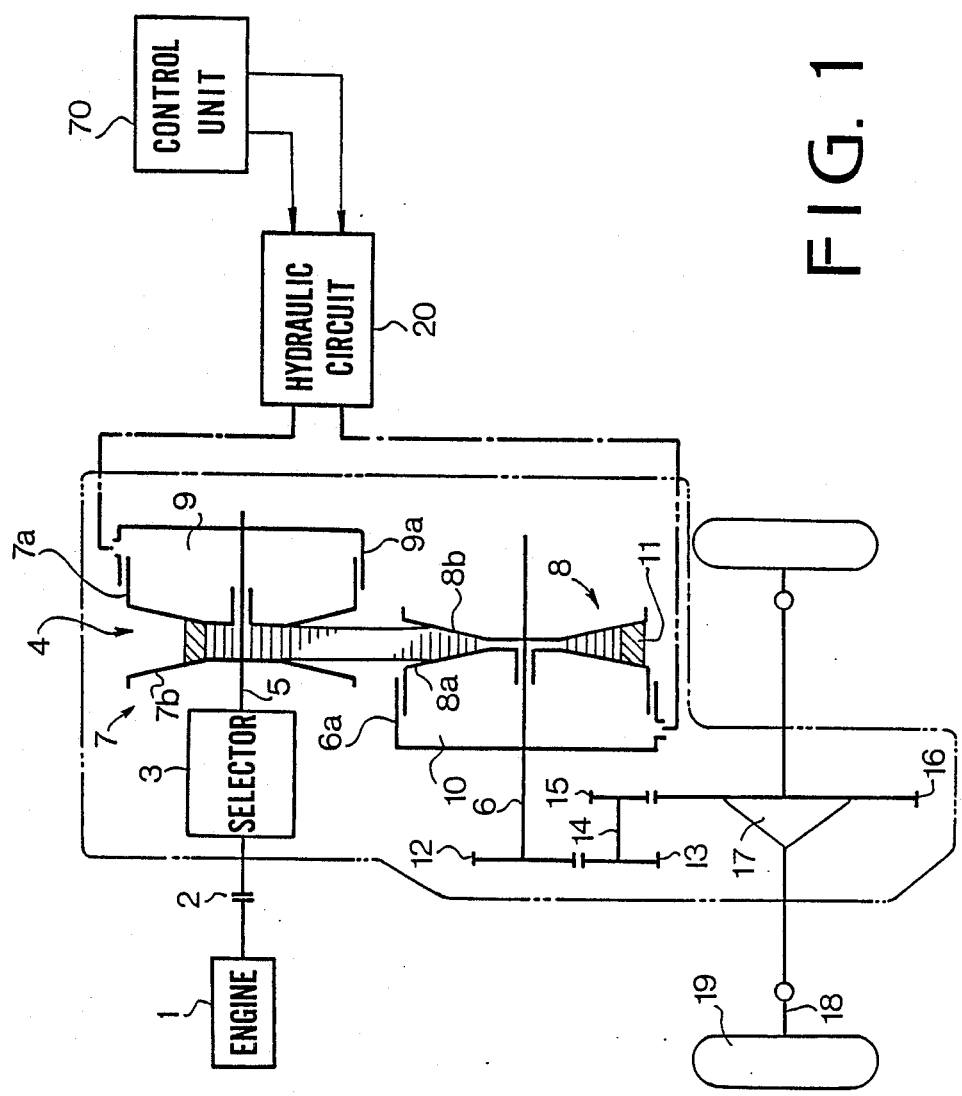
FIG. 1 is a schematic illustration of a continuously variable belt-drive transmission.

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on the shafts 5 and 6 respectively. A fixed conical disc 7b of the drive pulley 7 is integral with the main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

Figure 2A:
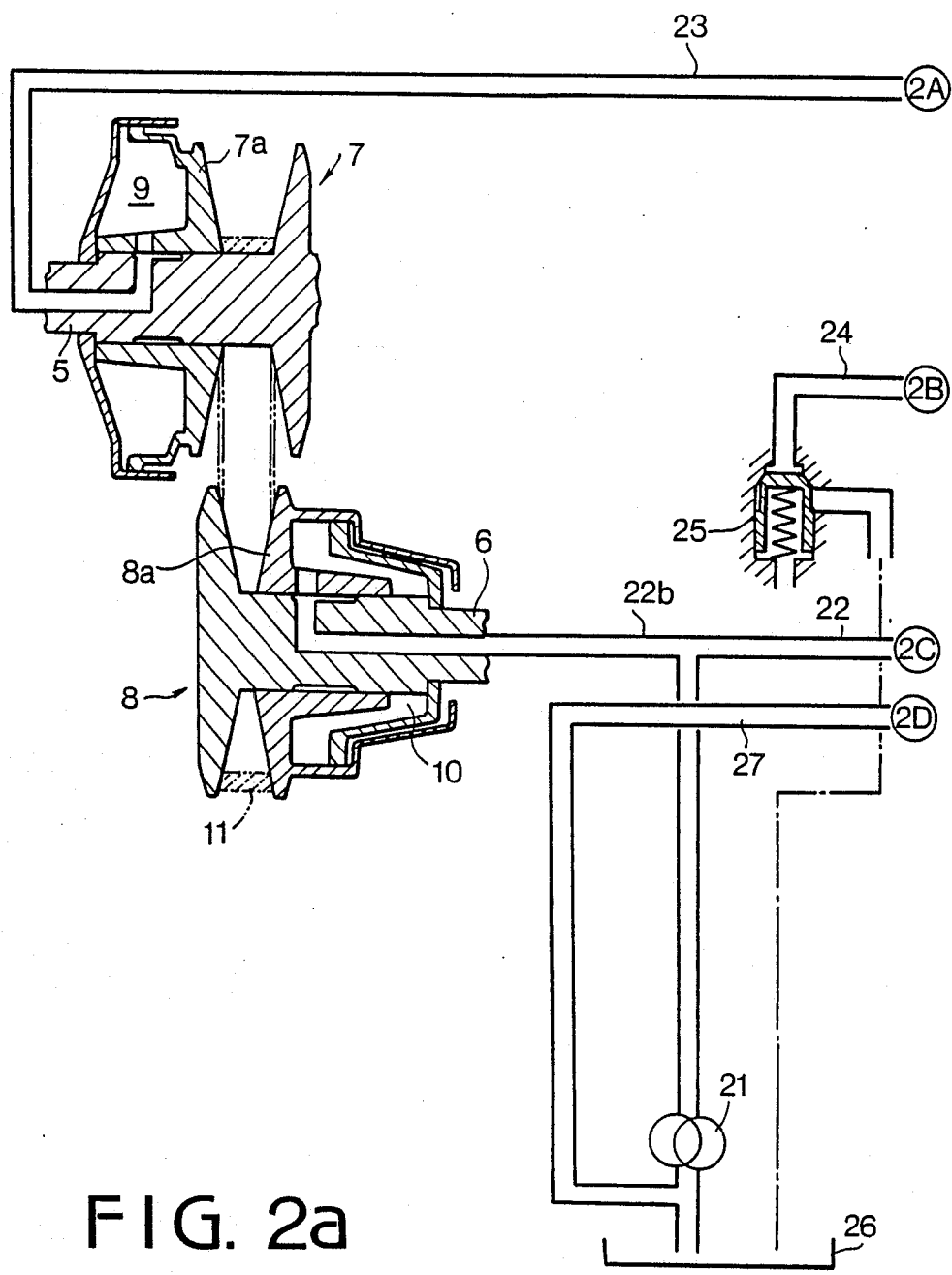
FIGS. 2a and 2b are schematic diagrams showing a control system according to the present invention.
Figure 2B:
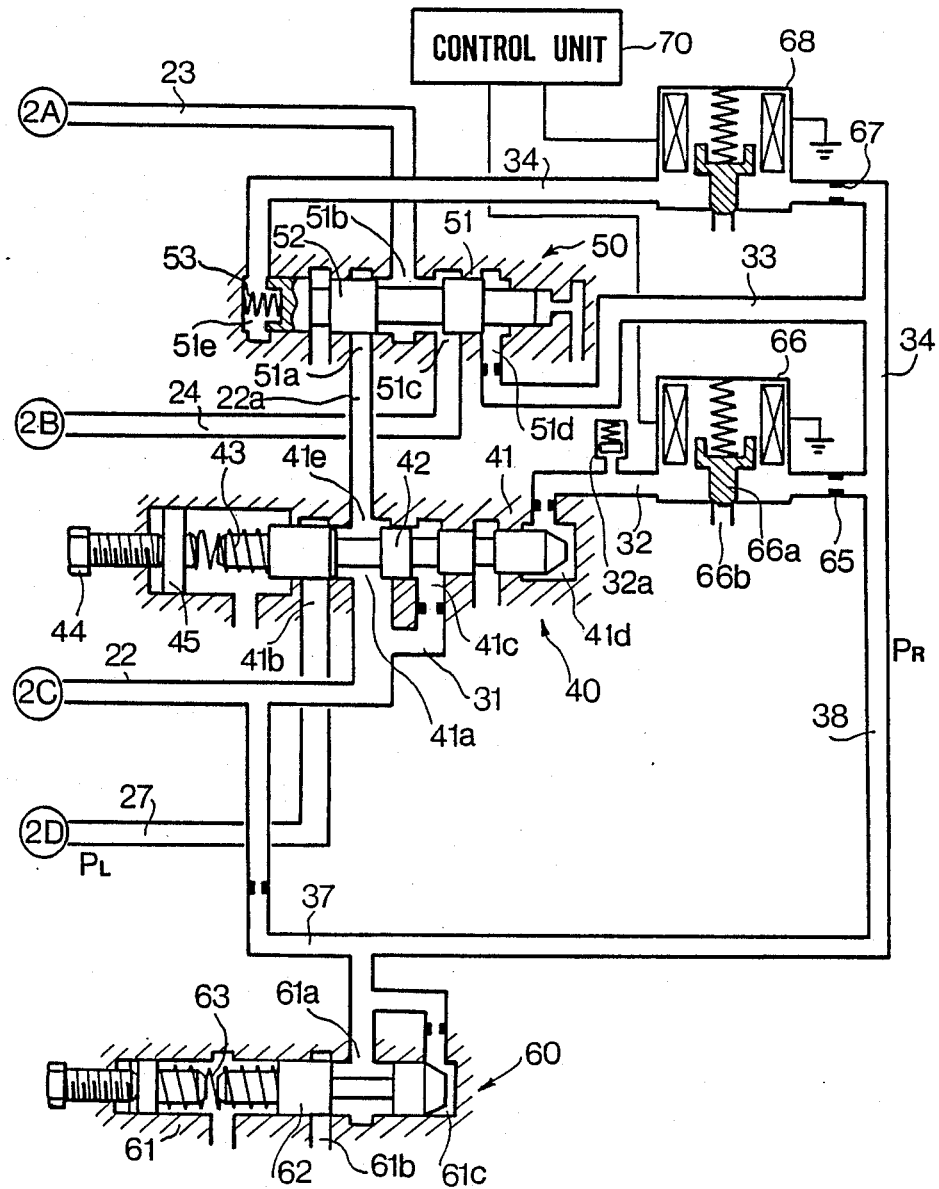

Referring to FIGS. 2a and 2b, the chamber 9 of the drive pulley 7 is supplied with pressurized oil by an oil pump 21 from an oil reservoir 26 passing through a line pressure conduit 22, ports 41a and 41e of a line pressure control valve 40, a transmission ratio control valve 50, and a conduit 23. The chamber 10 of driven pulley 8 is applied with pressurized oil through a passage 22b without passing through the valves 40 and 50. The movable conical disc 7a of the drive pulley 7 is so designed that the pressure receiving area thereof is larger than that of the movable conical disc 8a of the driven pulley 8. The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the force of a spring 43 provided between the end of the spool 42 and a retainer 45, the position of which is adjustable by a screw 44. The port 41a is communicated with a drain port 41b for a drain passage 27 in accordance with the position of a land of the spool 42. The drain port 41b communicates with oil reservoir 26 through passage 27.

The transmission ratio control valve 50 comprises a valve body 51, spool 52, and a spring 53 for urging the spool 52 in the downshift direction. A port 51b of the valve body 51 is selectively communicated with a pressure oil supply port 51a or a drain port 51c in accordance with the position of lands of the spool 52. The port 51b communicates with the chamber 9 through conduit 23, and the port 51a communicates with port 41e of line pressure control valve 40 through conduit 22a. The drain port 51c is communicated with the oil reservoir 26 through a conduit 24 and a check valve 25.

The system is provided with a regulator valve 60, and solenoid operated on-off valves 66 and 68.

The regulator valve 60 comprises a valve body 61, an inlet port 61a connected to the pump 21 through passages 37 and 22, a spool 62, an end chamber 61c connected to the passage 37, and a spring 63 urging the spool 62 to the chamber 61c. when the pressure of oil in the chamber 61c becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid operated on-off valve 66, and passage 32 having an accumulator 32a. Further, the passage 38 is communicated with an end chamber 51d of the transmission ratio control valve 50 through a passage 33, and with another end chamber 51e through an orifice 67, solenoid operated on-off valve 68 and passage 34. The solenoid operated on-off valve 66 is adapted to be operated by pulses. When energized, a valve 66a opens a drain port 66b. The pulsation of the pressure of oil in the passage 32 is smoothed by accumulator 32a. The solenoid operated on-off valve 68 is the same as valve 66 in construction and operation. The valves 66 and 68 are operated by signals from a control unit 70. Thus, pressure controlled by the valves 66 and 68 is applied to the chambers 41d and 51e.

In the transmission ratio control valve 50, the pressure receiving area of the spool 52 at chamber 51e is set to a value larger than the area at the chamber 51d. On the other hand, the control pressure in the chamber 51e can be changed between a maximum value, which is the same as the constant pressure in the chamber 51d, when the duty ratio is 0% and zero by controlling the duty ratio of the pulses for operating the valve 68. The transmission ratio control valve 50 is so arranged that the spool 52 is at a neutral position at a middle duty ratio (for example 50%) and is located in an oil supply position by increasing the duty ratio from the middle duty ratio because of the reduction of the control pressure in the chamber 51e. Further, the speed of the movement of the spool 52 changes with the magnitude of changing of the duty ratio. The spool 52 is shifted to an oil drain position by decreasing duty ratio. It will be understood that when the oil is supplied to the chamber 9, the transmission is upshifted.

The relationship between the duty ratio of the pulses applied to the solenoid operated control valve 68 and the transmission ratio is explained hereinafter.

The necessary volume V of oil in the chamber 9 is a function of the transmission ratio i, namely:

$$V = f(i)$$

The flow rate Q is obtained by differentiating the volume V with respect to time and expressed as $$Q = dV/dt = df(i)/di \cdot di/dt$$

$$di/dt = f(Q,i)$$

The supply flow ratio $Q_s$ and drain flow rate $Q_d$ are presented as $$Q_d = C \cdot S_d \sqrt{(2g\,P_p)/\gamma}$$
$$= a \cdot S_d \sqrt{P_p}$$

$$Q_s = a \cdot S_s \sqrt{Pl - P_p}$$

$$a = c \sqrt{2g/\gamma}$$

where
$P_p$ is the pressure in chamber 9,
Pl is the line pressure,
C is the coefficient for the flow rate,
g is the acceleration of gravity,
$\gamma$ is the specific gravity of oil,
$S_s$ is the opening area of the supply port 51a, and
$S_d$ is the opening area of the drain port 51c.

Designating by D the duty ratio of the pulses applied to the control valve, that is the ratio of ON/OFF of the valve, average flow rate Q in one cycle (oil supply state is positive) is $$Q = a(D \cdot S_s \sqrt{Pl - P_p} - (1 - D) \cdot S_d \sqrt{P_p})$$

Assuming a, $S_s$ and $S_d$ to be constants, $$Q = f(D, Pl, P_p)$$

The line pressure Pl is determined by the transmission ratio i and engine torque, and the pressure $P_p$ in the chamber 9 is determined by the transmission ratio i and line pressure Pl. Accordingly, assuming the engine torque to be constant, $$Q = f(D, i)$$

Since $di/dt = f(Q, i)$ $$di/dt = f(D, i)$$

Therefore $$D = f(di/dt, i) \qquad (1)$$

Accordingly, the duty ratio is determined by the transmission ratio changing rate di/dt and the transmission ratio i.

In a feedback control system, the transmission ratio changing rate di/dt can be determined by the diffence between the actual transmission ratio i and a a desired transmission ratio id, as follows.

$$di/dt = K(id - i)$$

where K is a coefficient.
Accordingly, the equation (1) can be expressed as follows.

$$D = f\{K(id - i), i\}$$
$$= f(id, i, K)$$

If K is fixed, $$D = f(id, i)$$

Therefore, the duty ratio D is determined in accordance with the desired transmission ratio id and actual transmission ratio i to the control transmission ratio changing rate di/dt. The duty ratio D can be derived from a look-up table having axes of id and i.

Figure 5A:
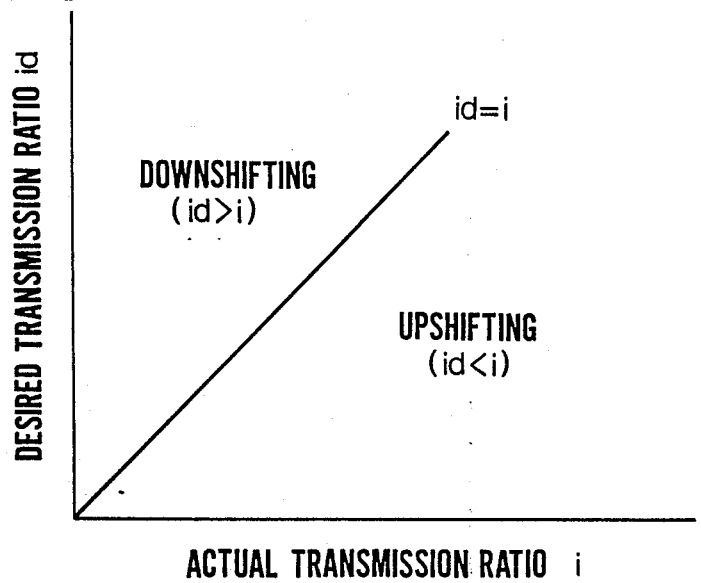
FIGS. 5a and 5b show look-up tables for duty ratios.

FIG. 5a shows a duty ratio table. The region of id>i is for downshifting of the transmission and the region of id<i is for upshifting.

Figure 5B:
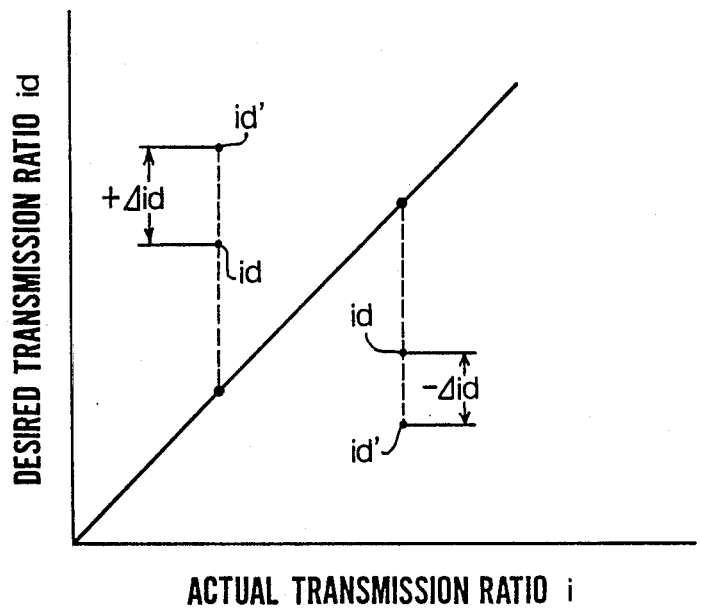

In order to change the rate di/dt with respect to the same id and i, the desired transmission ratio id in the table is changed. For example, in order to increase the rate di/dt in the downshift direction, a correcting quantity $\Delta id$ is added to id, and in the upshift direction $\Delta id$ is subtracted from id as shown in FIG. 5b. In order to reduce the rate di/dt, the reverse operation is done.

Figure 3:
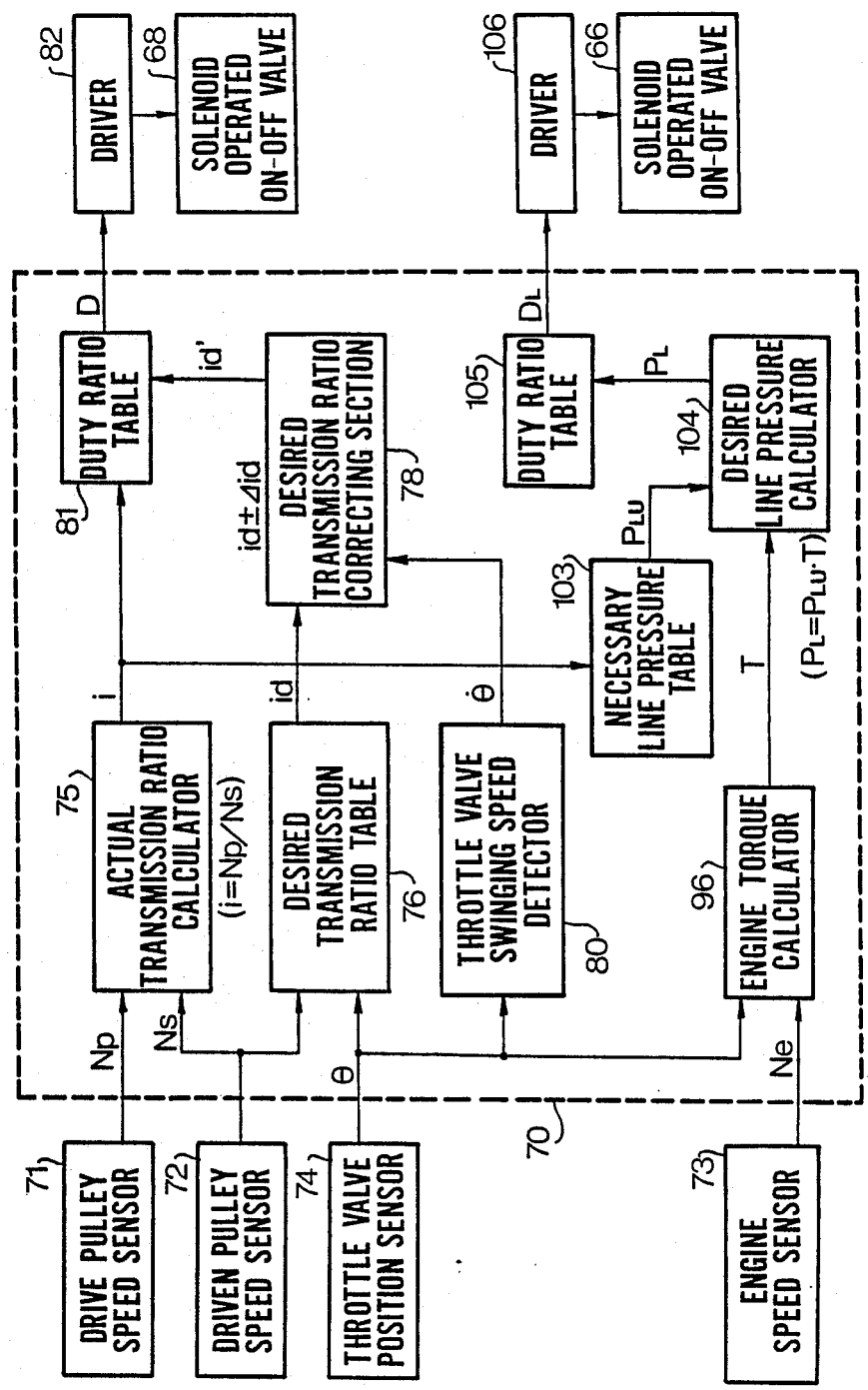
FIG. 3 is a block diagram showing a control unit.

Referring to FIG. 3, the system is arranged to control the transmission ratio in accordance with the above described principle. In the system, a drive pulley speed sensor 71, a driven pulley speed sensor 72, an engine speed sensor 73 and a throttle position sensor (or intake manifold pressure sensor) 74 are provided. Output signals $N_P$ and $N_S$ of the sensors 71 and 72, which are dependent on the speed of the drive pulley and driven pulley, are fed to an actual transmission ratio calculator 75 to produce an actual transmission ratio i in accordance with $i = N_P/N_S$. The output singla $N_S$ and output signal $\theta$ (dependent on the throttle valve position) of the throttle position sensor 74 are fed to a desired transmission ratio table 76. The desired transmission ratio id is derived from the table 76 in accordance with signals $N_S$ and $\theta$. The signal $\theta$ is also applied to a throttle valve swinging speed detector 80 which produces a throttle speed signal $\dot\theta$.

The desired transmission ratio id and throttle speed signal $\dot\theta$ are fed to a desired transmission ratio correcting section 78 where the correction of desired transmission ratio $id \pm \Delta id$ is made to produce a corrected desired transmission ratio id'. The actual transmission ratio i and corrected desired transmission ratio id' are applied to a duty ratio table 81 to derive the duty ratio D. The duty ratio D is supplied to the solenoid operated valve 68 through a driver 82.

Further, the output signal $\theta$ of throttle position sensor 74 and the output $N_e$ of engine speed sensor 73 are fed to an engine torque calculator 96, so that engine torque T is calculated based on throttle position $\theta$ and engine speed $N_e$.

On the other hand, the actual transmission ratio i from the calculator 75 is applied to a necessary line pressure table 103 to derive a necessary line pressure $P_{LU}$ per unit torque. The necessary line pressure $P_{LU}$ and the engine torque T are applied to a desired line pressure calculator 104 where a desired line pressure $P_L$ is calculated.

The desired line pressure $P_L$ is applied to a duty ratio table 105 to derive a duty ratio $D_L$ corresponding to the desired line pressure $P_L$. The duty ratio $D_L$ is supplied to a driver 106 which operates the solenoid operated on-off valve 66 at the duty ratio.

In operation, while the vehicle is at a stop, the chamber 10 of the driven pulley 8 is supplied with line pressure through passage 22b, and the chamber 9 of the drive pulley 7 is drained, since $N_P$, $N_S$, $\theta$ and the duty ratio D are zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the clutch current increases progressively with increase of engine speed. The electromagnetic clutch 2 is gradually engaged, transmitting the engine power to the drive pulley 7. The power of the engine is transmitted to the output shaft 6 at the largest transmission ratio by the drive belt 11 and driven pulley 8, and is further transmitted to the axles 18 of the driving wheels 19. Thus, the vehicle is started. When the vehicle speed (output signal $N_s$) exceeds a predetermined value, the clutch 2 is entirely engaged.

At the start of the vehicle, the line pressure is at the highest value by the pressure control valve 40, since the duty ratio for the valve 66 is large, and the spool 42 of the control valve 40 is at the right end position. When the throttle valve is opened for acceleration of the vehicle, the corrected desired transmission ratio id' is produced from the section 78. The corrected desired transmission radio id' and actual transmission ratio i are fed to the duty ratio table 81, so that duty ratio D for valve 68 is obtained from the table 81. When the depression of the accelerator pedal stops, the transmission ratio changing speed di/dt becomes negative. Accordingly, the value of the duty ratio D becomes larger than the neutral value, so that the pressure in the chamber 51d of the control valve 50 is higher tha the chamber 51e. Thus, the spool 52 is shifted to the left to communicate the port 51a with port 51b, so that oil is supplied to the chamber 9 through the conduit 23 to upshift the transmission at the rate di/dt. When the actual transmission ratio i reaches the desired transmission ratio id, the upshifting operation stops.

On the other hand, duty ratio for the valve 66 is reduced, thereby shifting the spool 42 of the valve 40 to the left. The port 41a communicates with the port 41b of the drain passage 27 to reduce the line pressure.

As the difference between the desired ratio id and actual ratio i becomes large and the desired transmission ratio changing rate becomes large, the duty ratio for the valve 68 becomes large, thereby increasing the shifting speed of the spool 52 to increase the actual transmission ratio changing rate. When the opening degree of the throttle valve is reduced for deceleration, the duty ratio is reduced along a low engine speed line, thereby shifting the spool 52 to the right to drain the chamber 9. Thus, the transmission is downshifted. The transmission ratio changing rate at downshifting increases with reducing of the duty ratio.

Figure 4:
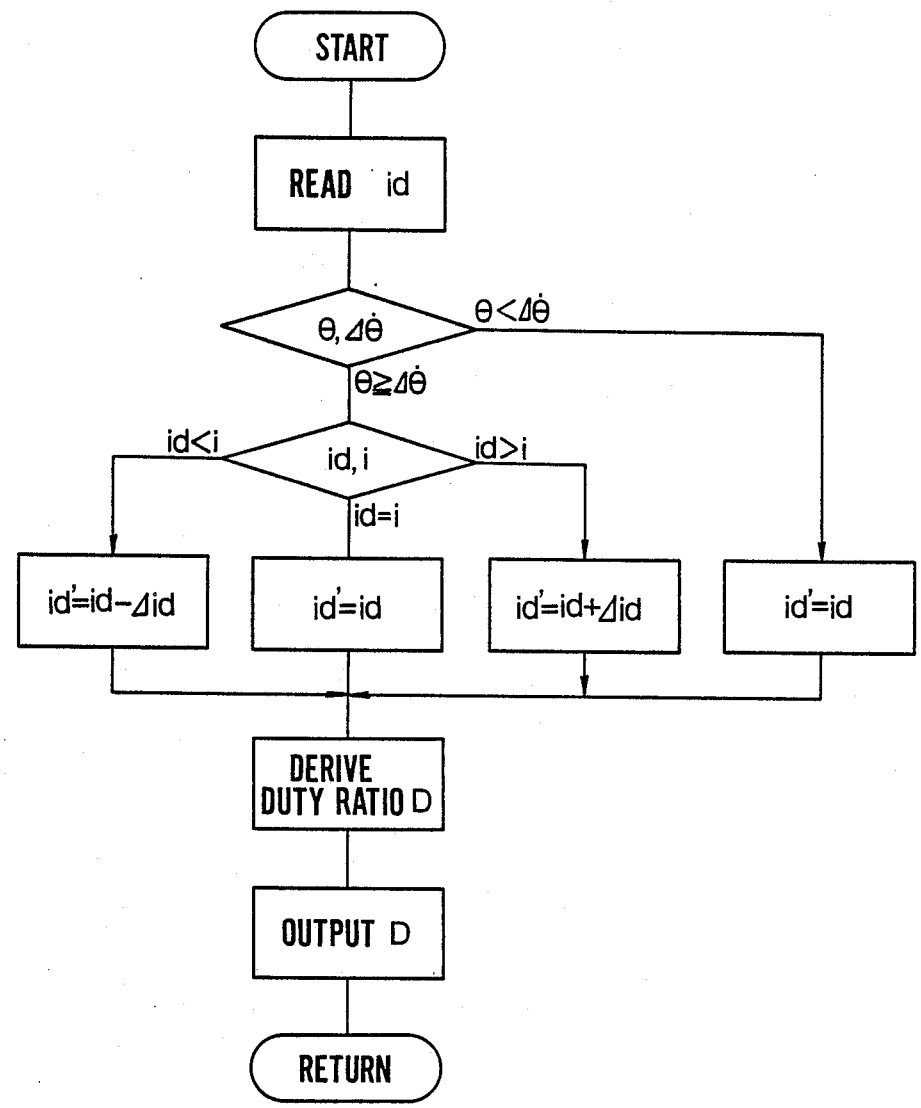
FIG. 4 is a flowchart showing the main operation of the system.

The control operation of line pressure will be described hereinafter with reference to FIG. 4. When the throttle speed $\dot\theta$ is lower than a predetermined speed $\Delta\dot\theta$, the correcting quantity $\Delta id$ is set to zero (id'=id). Accordingly, the duty ratio is derived from the table 81 in accordance with the actual transmission ratio i and desired ratio id. When $\dot\theta \geq \Delta\dot\theta$, the duty ratio is determined by quantities of id and i. For example, when id<i, which means upshifting, the duty ratio is derived in accordance with id' (id−$\Delta id$) and i. Accordingly, the duty ratio D becomes large by a quantity corresponding to $\Delta id$, so that the transmission ratio changing rate is increased.

The present invention is not limited to the above described embodiment. For example, the correcting quantity $\Delta id$ may be changed in accordance with an operating condition such as the throttle valve swinging speed $\dot\theta$. The duty ratio can be obtained in accordance with the difference between the desired transmission ratio and the actual transmission ratio (id−i) and with the actual transmission ratio. It is possible to change the transmission ratio changing rate di/dt by multiplying id−i by a coefficient K' (K'(id−i)).

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A control system for a continuously variable transmission for transmitting power of an internal combustion engine to driving wheels of a motor vehicle, the transmission having a drive pulley including a hydraulically shiftable disc and a first hydraulic cylinder for shifting the disc, a driven pulley including a shiftable disc and a belt engaged with both pulleys, the control system including a transmission ratio control valve having ports and a spool, and a first hydraulic circuit having a pump for supplying oil to the first hydraulic cylinder through the transmission ratio control valve, the control system further comprising:
   first detecting means for producing a first speed signal representing input speed of the transmission;
   second detecting means for producing a second speed signal representing output speed of the transmission;
   third detecting means for detecting load on the engine and for producing a load signal;
   first means responsive to the first and second speed signals for producing an actual transmission ratio signal;
   second means responsive to the load signal and to the second speed signal for producing a desired transmission ratio signal;
   a memory storing a plurality of control signals which are arranged in accordance with desired transmission ratio signals and actual transmission ratio signals divided into an upshift region and downshift region in dependency on both the ratio signals being different;
   one of said control signals being derived from the memory in response to and in accordance with the desired transmission ratio signal and the actual transmission ratio signal;
   third means responsive as a function of said one control signal for shifting the spool of the transmission ratio control valve so as to provide a transmission ratio; and
   said memory having a desired transmission ratio correction section storing a plurality of corrected desired transmission ratio signals which are arranged in accordance with desired transmission ratio signals and actual transmission ratio signals divided into an upshift region and downshift region in dependency on both the latter ratio signals being different, said memory further includes another section storing said plurality of control signals arranged in accordance with corrected desired transmission ratio signals and actual transmission ratio signals.

2. The control system according to claim 1 wherein the third means includes a second hydraulic circuit for supplying oil to the transmission ratio control valve so as to shift the spool and control valve means provided in the second hydraulic circuit for controlling the amount of oil supplied to the transmission ratio control valve.

3. The system according to claim 2 wherein the control valve means is a solenoid operated on-off valve, and the control signals are pulses for operating the on-off valve, the duty ratio of which is changed so as to control the line pressure.

4. The system according to claim 1, further comprising
   fourth means for changing said control signals.

5. The system according to claim 4, wherein
   said fourth means changes said control signals as a function of throttle valve swinging speed of a throttle valve of the engine.

6. The system according to claim 1, wherein
   said control signals equal said desired transmission ratio signal when a throttle valve swinging speed of a throttle valve of the engine is less than a predetermined value.

7. The system according to claim 1, wherein
   said control signals in said memory are equal to said desired transmission ratio signal plus or minus a fixed value when one of said ratio signals is larger than the other and visa versa respectively and equal to said desired transmission ratio signal when said ratio signals are equal.

8. The system according to claim 7, wherein
   said control signals equal said desired transmission ratio signal when a throttle valve swinging speed of a throttle valve of the engine is less than a predetermined value.

9. A control system for a continuously variable transmission for transmitting power of an internal combustion engine to driving wheels of a motor vehicle, the transmission having a drive pulley including a hydraulically shiftable disc and a first hydraulic cylinder for shifting the disc, a driven pulley including a shiftable disc and a belt engaged with both pulleys, the control system including a transmission ratio control valve having ports and a spool, and a first hydraulic circuit having a pump for supplying oil to the first hydraulic cylinder through the transmission ratio control valve, the control system further comprising:
   first detecting means for producing a first speed signal representing input speed of the transmission;
   second detecting means for producing a second speed signal representing output speed of the transmission;
   third detecting means for detecting load on the engine and for producing a load signal;
   first means responsive to the first and second speed signals for producing an actual transmission ratio signal;
   second means responsive to the load signal and to the second speed signal for producing a desired transmission ratio signal;
   a memory storing a plurality of control signals which are arranged in accordance with desired transmission ratio signals and actual transmission ratio signals divided into an upshift region and downshift region in dependency on both the ratio signals being different;
   one of said control signals being derived from the memory in response to and in accordance with the desired transmission ratio signal and the actual transmission ratio signal;
   third means responsive as a function of said one control signal for shifting the spool of the transmission ratio control valve so as to provide a transmission ratio; and each control signal stored in the memory is determined in accordance with changing rate of the transmission ratio dependent on the different between the desired and actual transmission ratio signals; and said memory having a desired transmission ratio correction section storing a plurality of corrected desired transmission ratio signals which are arranged in accordance with desired transmission ratio signals and actual transmission ratio signals divided into an upshift region and downshift region in dependency on both the latter ratio signals being different, said memory further includes another section storing said plurality of control signals arranged in accordance with corrected desired transmission ratio signals and actual transmission ratio signals.

10. The system according to claim 9, wherein each of said corrected desired transmission ratio signals stored in the memory is further determined in accordance with a factor comprising a coefficient (K').

11. The system according to claim 10, wherein said control signals in said memory are equal to said desired transmission ratio signal plus or minus a fixed value when one of said ratio signals is larger than the other and visa versa respectively and equal to said desired transmission ratio signal when said ratio signals are equal; and said control signals equal said desired transmission ratio signal plus said fixed value when said desired transmission ratio signal is greater than said actual transmission ratio signal, and said control signals equal said desired transmission ratio signal minus said fixed value when said desired transmission ratio signal is smaller than said actual transmission ratio signal to increase changing rate of the transmission ratio in downshift and upshift direction respectively.

12. A control system for a continuously variable transmission for transmitting power of an internal combustion engine to driving wheels of a motor vehicle, the transmission having a drive pulley including a hydraulically shiftable disc and a first hydraulic cylinder for shifting the disc, a driven pulley including a shiftable disc and a belt engaged with both pulleys, the control system including a transmission ratio control valve having ports and a spool, and a first hydraulic circuit having a pump for supplying oil to the first hydraulic cylinder through the transmission ratio control valve, the control system further comprising:

first detecting means for producing a first speed signal representing input speed of the transmission;

second detecting means for producing a second speed signal representing output speed of the transmission;

third detecting means for detecting load on the engine and for producing a load signal;

first means responsive to the first and second speed signals for producing an actual transmission ratio signal;

second means responsive to the load signal and to the second speed signal for producing a desired transmission ratio signal;

a memory storing a plurality of control signals which are arranged in accordance with desired transmission ratio signals and actual transmission ratio signals divided into an upshift region and downshift region in dependency on both the ratio signals being different;

one of said control signals being derived from the memory in response to and in accordance with the desired transmission ratio signal and the actual transmission ratio signal;

third means responsive as a function of said one control signal for shifting the spool of the transmission ratio control valve so as to provide a transmission ratio;

said control signals in said memory are equal to said desired transmission ratio signal plus or minus a fixed value when one of said ratio signals is larger than the other and visa versa respectively and equal to said desired transmission ratio signal when said ratio signals are equal; and said control signals equal said desired transmission ratio signal plus said fixed value when said desired transmission ratio signal is greater than said actual transmission ratio signal, and said control signals equal said desired transmission ratio signal minus said fixed value when said desired transmission ratio signal is smaller than said actual transmission ratio signal to increase changing rate of the transmission ratio in downshift and upshift direction respectively.

13. A control system for a continuously variable transmission for transmitting power of an internal combustion engine to driving wheels of a motor vehicle, the transmission having a drive pulley including a hydraulically shiftable disc and a first hydraulic cylinder for shifting the disc, a driven pulley including a shiftable disc and a belt engaged with both pulleys, the control system including a transmission ratio control valve having ports and a spool, and a first hydraulic circuit having a pump for supplying oil to the first hydraulic cylinder through the transmission ratio control valve, the control system further comprising:

first detecting means for producing a first speed signal representing an input speed of the transmission;

second detecting means for producing a second speed signal representing an output speed of the transmission;

third detecting means for detecting load on the engine and for producing a load signal;

first means responsive to the first and second speed signals for producing an actual transmission ratio signal;

second means responsive to the load signal and to the second speed signal for producing a desired transmission ratio signal;

memorizing means for storing a plurality of control signals representing said desired transmission ratio and actual transmission ratio signals addressed into an upshift region and downshift region in dependency on said both desired and actual transmission ratio signals being different;

decision means responsive to said desired and actual transmission ratio signals for deciding one of said control signals stored in the memorizing means;

third means responsive to said one of the control signals for shifting the spool of the transmission ratio control valve to provide a transmission ratio, and said memorizing means including a desired transmission ratio correction section for storing a plurality of corrected desired transmission ratio signals which are arranged in accordance with desired transmission ratio signals and actual transmission ratio signals divided into an upshift region and downshift region in dependency on both the latter ratio signals being different, said memorizing means further including another section for storing said plurality of control signals in accordance with corrected transmission ratio signals and actual transmission ratio signals.

* * * * *